United States Patent [19]

Holmes et al.

[11] 4,036,625

[45] July 19, 1977

[54] METHOD OF AND FURNACE FOR BATCH CHARGING INTO A GLASS MELTING FURNACE

[75] Inventors: Charles Chamberlain Holmes, Birmingham; Wallace Skinner, Kingswinford; George Roland Mattocks, Kidderminster, all of England

[73] Assignee: Elemelt Limited, London, England

[21] Appl. No.: 674,943

[22] Filed: Apr. 8, 1976

[30] Foreign Application Priority Data

Apr. 8, 1975 United Kingdom ............... 14308/75

[51] Int. Cl.² ............................................. C03B 3/00
[52] U.S. Cl. ......................................... 65/134; 65/27; 65/335; 214/21
[58] Field of Search .......................... 65/335, 134, 27; 214/18 GD, 21

[56] References Cited

U.S. PATENT DOCUMENTS

| 776,196 | 11/1904 | Nicholls | 65/335 |
| 1,799,371 | 4/1931 | Hitner | 65/335 X |
| 3,219,209 | 11/1965 | Blaine | 65/335 X |
| 3,877,917 | 4/1975 | Hohman | 65/335 X |

*Primary Examiner*—Arthur D. Kellogg
*Attorney, Agent, or Firm*—Spencer & Kaye

[57] ABSTRACT

This invention relates to a furnace for the melting of glass. The furnace comprises means defining an opening through which solid state batch material may be delivered into the furnace chamber and to enable the rate of withdrawal of glass to be varied without substantial alteration in the temperature of the body of molten glass, which is exposed for the reception of batch material. Thus the area of contact between the body of molten glass and the batch may be varied, to vary the rate at which the batch material is melted.

22 Claims, 4 Drawing Figures

METHOD OF AND FURNACE FOR BATCH CHARGING INTO A GLASS MELTING FURNACE

BACKGROUND OF THE INVENTION.

In the manufacture of glass or the like heat fuseable vitreous materials (herein included in the term "glass" for the convenience of reference) conventionally there is used a furnace comprising a furnace chamber for containing a body of molten glass, heating means for heating the body of molten glass, and outlet means through which glass is conducted from the chamber. Conveniently, the body of molten glass is heated electrically, using Joule effect heating said heating means thus comprising electrodes extending into the furnace chamber. Conventionally, the furnace is open-topped, thus comprising an opening through which solid state glass batch material may be delivered into the furnace chamber.

In the use of such a furnace, batch material is delivered through the opening, being deposited on the top of the body of molten glass in the furnace chamber, thus causing the whole of the upper surface of the body to be covered by a relatively cool layer of batch material to a generally uniform thickness. The lower surface of this layer continuously melts away to join the body of molten glass in the chamber, whilst molten glass is withdrawn from outlet means, advantageously from a lower portion of the chamber, whilst fresh batch material is continually spread over the upper surface to replace the melted material.

It is in practice desirable to retain the thickness of the layer of batch material substantially constant, or within upper or lower limits, which depend upon the chemical and physical nature of the mixture of raw materials included in the batch material, the temperature of the body of molten glass, and the specific rate of melting of the lower surface of the layer. Typically, an optimum thickness may be 14 inches, or may (with a different furnace design) be as little as 3 inches.

Should the layer of batch material become either too thin or too thick, it becomes difficult to operate the furnace efficiently. Since in the production of a particular glass, only very limited adjustment of the chemical and physical nature of the raw materials is feasible, and since also the production of glass of satisfactory quality depends upon the maintenance of a substantially constant temperature of the body of molten glass, the need to maintain the layer of batch material imposes limitations on the rate of removal of glass from the furnace. Thus, with a particular type of glass being produced, and with a specific furnace, the ratio of the highest and lowest rates of removal which can be tolerated (known as the production range) will be approximately 2:1.

In many glass manufacturing operations, even when producing only a single glass composition, a production range greater than 2:1 is greatly desired. In addition, some furnaces are required to melt two or more types of glass each having different characteristics with respect to the formation of the layer of batch material, which further affects the flexibility of a specific furnace.

It is one of the various objects of this invention to provide a furnace in which the production range may be increased without unduly affecting the quality of the glass manufactured.

It is another of the various objects of this invention to provide a method of melting glass, by the performance of which the rate of production of glass may be adjusted as desired.

SUMMARY OF THE INVENTION

This invention provides a furnace for use in the melting of glass and comprising a furnace chamber for containing a body of molten glass, heating means for heating the body of molten glass, and outlet means through which molten glass is conducted from the chamber, wherein the furnace comprises
  a. means defining an opening through whch solid state glass batch material may be delivered into the furnace chamber, and
  b. means for varying the area of the molten glass which is exposed for the reception of batch material.

In this manner, the effective melting area of the furnace may be varied to allow the output of the furnace to be varied over a wide range, whilst permitting the temperature of the body of molten glass and the thickness of the layer of batch material, to be retained within an optimum range.

Preferably, the means for varying the surface area of the molten glass which is exposed for the reception of batch material comprises covering means adapted to cover part of the opening. Preferably, such covering means provides a thermal barrier, to restrict heat flow from the surface of the body of molten glass over which it extends, that is, part of the body of molten glass other than that covered by a layer of batch material. Thus, where the means for defining the opening through which solid state batch material may be delivered comprises wall members of the furnace, the covering means may advantageously be provided by one or more roof sections which may be mounted on the wall members over the opening to restrict the area of the opening through which batch material may be delivered to the furnace chamber.

However, if desired, floatable insulation elements may be provided, and which may be positioned on the body of molten glass in the chamber to restrict the area of glass presented for application of batch material.

Alternatively, selectively positionable means may be provided, which is mounted for movement across the opening between a withdrawn position in which the opening is at least substantially unrestricted, and solid state batch material may be introduced into the chamber to lie on substantialy the whole of the surface of molten glass in the chamber, and an advanced position in which said means extends over a major part of the opening, exposing a minor part of the surface of molten glass in the chamber for the application of batch material. Thus, the selectively positionable means provides a roof assembly which permits the size of the opening to be continuously varied, between limits, whereby the rate of melting of batch material, and thus the rate of withdrawal of glass from the chamber, may be varied, whilst the temperature of the body of molten glass, and the thickness of the layer of batch material on the surface of the said body, may be retained at or adjacent to desired values.

Variation in the size of the opening will also vary the relative thermal loads between various parts of the furnace chamber, since the load in the vicinity of the opening will be greater than that on the remaining part. Thus, preferably control means is provided to vary the supply of electrical energy to the electrodes, whereby the temperature distribution in the chamber may be adequately controlled at whichever selective output the furnace is operating.

This invention also provides in a furnace for use in the melting of glass or the like vitreous material and comprising a furnace chamber for containing a body of molten glass, outlet means through which molten glass may be conducted from the chamber, and heating means for heating the body of molten glass, the improvement wherein the furnace is provided with means defining an opening through which solid state glass batch material may be introduced into the chamber to lie on the body of molten glass within the chamber, means being provided which is selectively positionable across the opening to restrict the area of glass presented for the application of batch material.

This invention also provides in combination, a. a furnace for use in the melting of glass and comprising a furnace chamber for containing a body of molten glass and having means defining an opening through which solid state glass batch material may be introduced into the chamber to lie on the body of molten glass, outlet means through which molten glass may be conducted from the chamber, heating means for heating the body of molten glass, and barrier means for varying the surface area of the molten glass which is exposed for the application of batch material, and b. feeding mechanism to deliver batch material to the furnace chamber, the feeding mechanism being capable of delivering batch material over the whole of the surface of the molten glass, and having associated therewith control means which is operative to restrict the area of the molten glass to which the feeding mechanism delivers solid state material.

This invention also provides a method of melting glass comprising a. delivering a solid state glass material onto the surface of a body of molten glass undergoing heating in a furnace chamber;

b. withdrawing molten glass from the chamber; and c. controlling the area of the surface of the body of molten glass onto which glass batch material is delivered in accordance with the rate of withdrawal of molten glass from the chamber.

Figure 1:
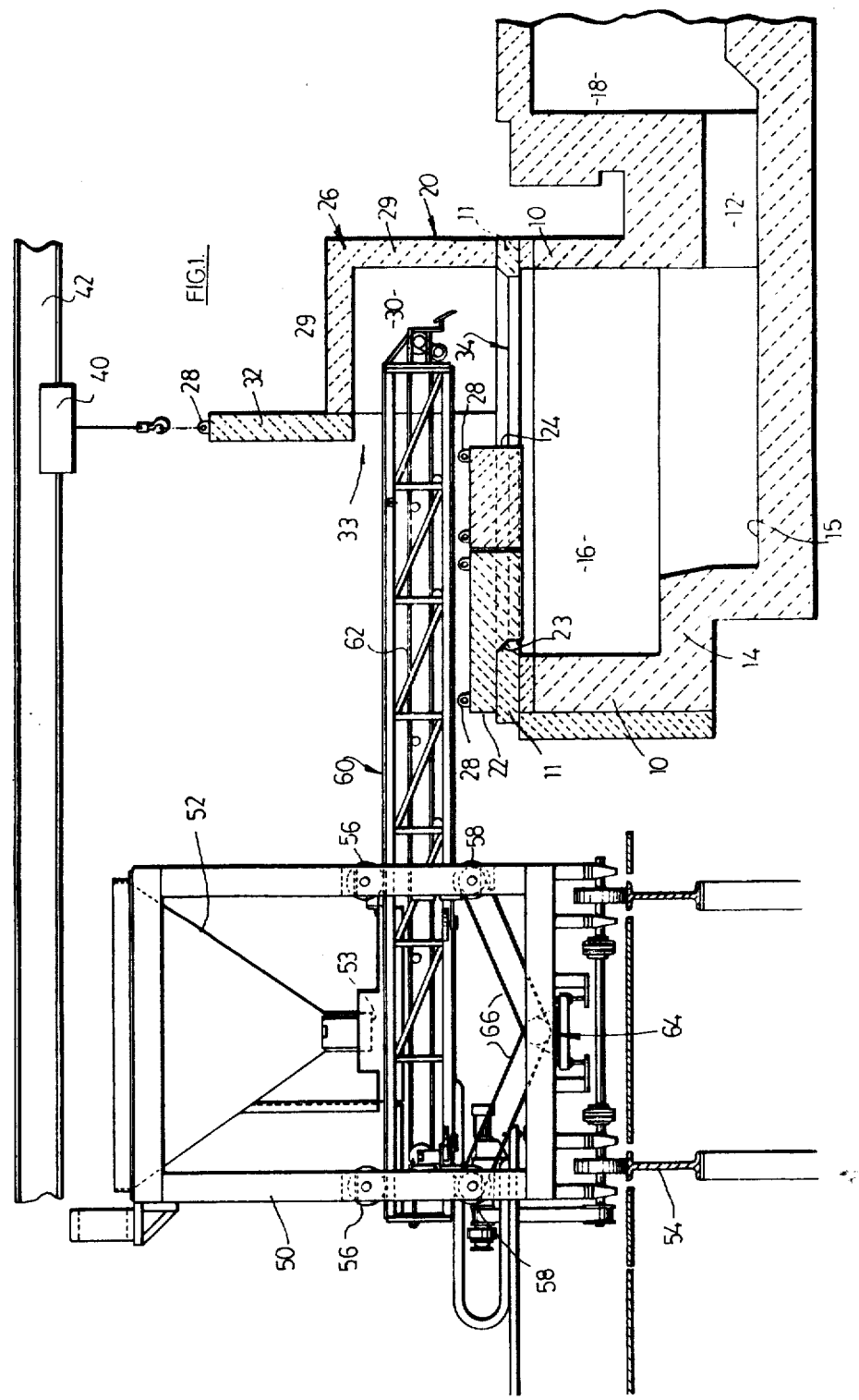
FIG. 1 is a side sectional view of a glass melting plant, comprising a glass melting/refining furnace which is a first embodiment of this invention and mechanism for feeding raw glass-making materials to the furnace.
Figure 2:
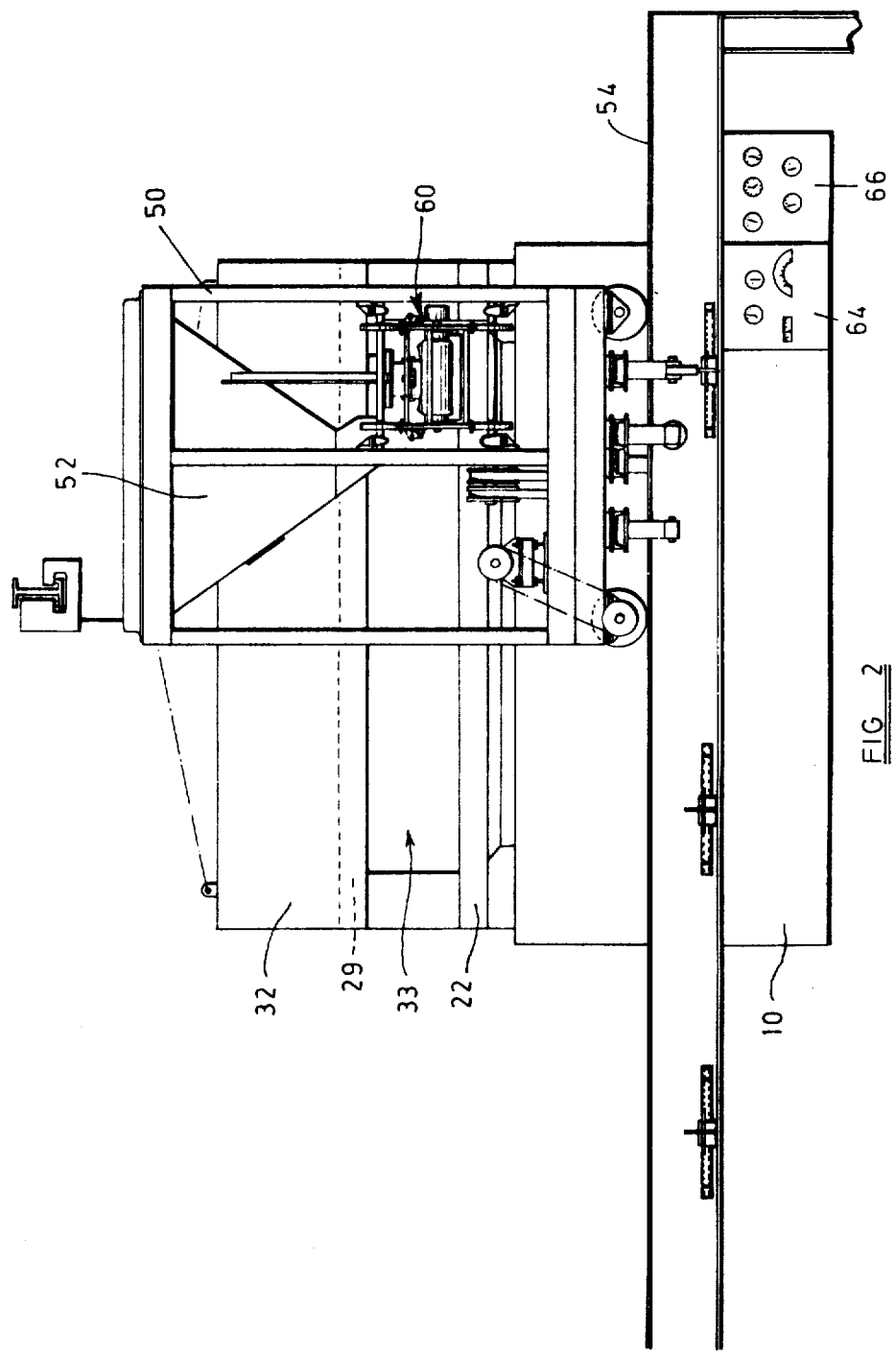
FIG. 2 is an end elevation, as viewed in the direction of the arrow A of FIG. 1, of said glass melting plant.

DETAILED DESCRIPTION OF THE PREFERRED EMBODIMENTS.

The glass melting/refining furnace which is the first embodiment of this invention comprises vertically-extending side walls 10 and a bottom wall 14 defining an open-topped furnace chamber 16. Extending through the bottom wall 14 is a plurality of vertical electrodes (not shown), and extending into the bottom wall to an outlet duct 12 in one of the side walls is an outlet channel 15, the outlet duct 12 extending to a refining chamber 18 from which molten glass may be drawn as required.

The said melting/refining furnace is part of a glass melting plant comprising also a feeding mechanism for the delivery of raw glass making materials in solid state form, (herein referred to as glass batch material) to the furnace chamber 16 through the open top thereof, in a manner such that the batch material lies on the top of a body of molten glass within the furnace chamber, to be progressively melted.

The feeding mechanism comprises a track 50 provided with a hopper 52, into which glass batch material may be loaded. The truck is mounted for travelling movement along a rail track 54, which extends the full width of the furnace chamber 16 to a parking bay (not shown). Mounted beneath an outlet 53 of the hopper 52, and between upper and lower rollers 56, 58, is the boom of a conveyor assembly 60. By means of a motor 64 and pulley belts 66, the rollers 58 may be driven to move the boom in a direction lengthwise of the furnace (that is, in a direction parallel to the direction of flow of glass from the melting chamber 16 to the refining chamber 18) between an advanced position (adjacent to that position shown in FIG. 1) and a retracted position. The conveyor assembly comprises an endless belt 62 onto which glass batch material falling from the hopper outlet falls, to be conveyed by said belt 62 along a feed path extending lengthwise of the furnace, batch material falling from a leading portion of the belt into the furnace chamber.

In the operation of the feeding mechanism, the truck 50 makes one or more "passes", each extending substantially the whole width of the furnace, with differing degrees of extension of the conveyor assembly boom, so that glass batch material is spread substantially uniformly over the entire area of the body of molten glass which is exposed for the reception of glass batch material.

The furnace also comprises a roof assembly 20 overlying the chamber 16, and which comprises a plurality (specifically three in the first embodiment) of roof sections 22, 24, 26. Each of these roof sections is provided with appropriate channelling 23 on a lower side wall thereof to enable the roof section to seat on a lip 11 provided on an upper end of the side walls 10. Each of the sections if provided with one or more eye bolts 28, by which the roof sections may be lifted from the furnace chamber by the use of an electrically-operated hoist 40 mounted for movement across the furnace on a girder 42.

The sections 22 and 24, when mounted on the side walls 10 to overlie the chamber, extend downwardly towards the body of molten glass a sufficient distance so as to be in close proximity to the normal upper level of the surface of the melt in the chamber. However, the section 26 comprises fixed side and end walls 29, defining an open-fronted inlet chamber 30. The section 26 additionally comprises a front wall 32 slidably mounted in channels provided by the side walls 29 in a vertical direction between an inoperative position (shown in FIG. 1) in which access to the chamber 30 through aperture 33 is permitted, and an operative position in which the aperture 33 is closed.

The aperture 33 extends the full width of the furnace (that is, in a direction at right angles to the direction of flow of molten glass from the chamber 16 to the chamber 18), and in use, the boom of the conveyor assembly 60 extends through the aperture 33. Thus, the glass batch material delivered along the feed path by the conveyor belt 62 will fall from said belt within the chamber 30, and will fall through the restricted opening 34 of the chamber 16 on to the surface of the body of molten glass therein. Upon completion of an appropriate number of "passes" of the feeding mechanism, as is necessary to build up a layer of batch material on the exposed surface of the body of molten glass to a substantially uniform, desired thickness, the boom is withdrawn from the aperture 33, by operation of the motor 64, and the front wall 32 is moved to its operative position to close the aperture 33. The truck 50 may then be moved along the rail track to the parking bay, at which further batch material may be loaded into the hopper 52. Subsequently, when it is necessary to add further batch material to the furnace, the front wall is lifted to its inoperative position, and the boom extended to deposit further batch material through the opening 34.

In the operation of the furnace, the rate of melting of the glass batch material will depend upon the temperature of the body of melt in the chamber 16 and upon the area of contact between the glass batch material and said body. Thus, with approximately constant temperature conditions, the facility for varying the rate of withdrawal of molten glass from the refining chamber 18 (glass flowing from the body in the chamber 16 through the outlet duct 12 into the chamber 18) is limited, other than by the practice of this invention.

In the practice of this invention, the output of the furnace may be increased by increasing the surface area of the body of molten glass in the furnace chamber 16 which is exposed for the reception of further glass batch material. This is effected in the first embodiment by the removal of roof section 24 and restructuring the section 26 to increase the size of the opening 34. This may be effected by replacing the existing section 26 with a further similar section having longer side and top walls, or by temporarily fully retracting the front wall 29 and adding further side and top wall portions.

Upon completion of the enlargement of the roof section 26, further glass batch material may be deposited upon the larger surface of the body of molten glass now exposed for its reception. Thus, whilst constant temperature conditions are maintained, the rate of melting of the glass batch material will now be higher, allowing molten glass to be withdrawn from the refining chamber 18 whilst maintaining a substantially constant desired level of glass within the chamber 16.

To facilitate uniform spreading of glass batch material over the exposed surface of the body of molten glass within the chamber 16, the feeding mechanism is preferably provided with control means, conveniently in the form of manually operable control mechanism 64,66. The control mechanism is operative to vary a number of "passes" made by the truck 50, and also movement of the boom between its retracted and advanced positions, in accordance with the particular construction of roof assembly existing. Thus, when the roof section 26 has been restructured or replaced, the control mechanism will be operated to cause the feeding mechanism to make at least one further pass with the boom in a position such that glass batch material will be deposited upon the area of glass melt now exposed.

At maximum output, the roof assembly may be dispensed with, and the control mechanism may be operated to cause the feeding mechanism to spread glass batch material over the entire opening of the chamber 16, as defined by the side walls 10.

Thus, by the practice of this invention, the production rate of a furnace may be varied as desired whilst maintaining an optimum operating temperature, and an optimum thickness of batch material over the entire exposed surface of the body of molten glass.

In addition to restricting the area of the body of molten glass within the chamber 16 available for the application of batch material, the roof assembly as a whole provides thermal barrier means operative to restrict loss of heat from the furnace chamber, and the roof sections 22 and 24 in particular are operative to protect the boom of the conveyor assembly from the detrimental effects of heat which would be otherwise radiated from an uncovered body of molten glass.

The melting/refining furnace which is the second embodiment of this invention comprises side walls 110 defining an open-topped furnace chamber 116, and a refining chamber 118, molten glass flowing from the chamber 116 into the chamber 118 through outlet means in the form of an outlet duct 112. Mounted over the chamber 116 is an exterior roof assembly comprising side walls 120, 122, front and rear walls 124, 126 and a roof section 128. The side walls 120 and the front wall 124 are slidably mounted in a vertical direction, again conveniently by the provision of eye-bolts mounted thereon, and an electrically-powered hoist (not shown) mounted for traverse thereabove.

Figure 3:
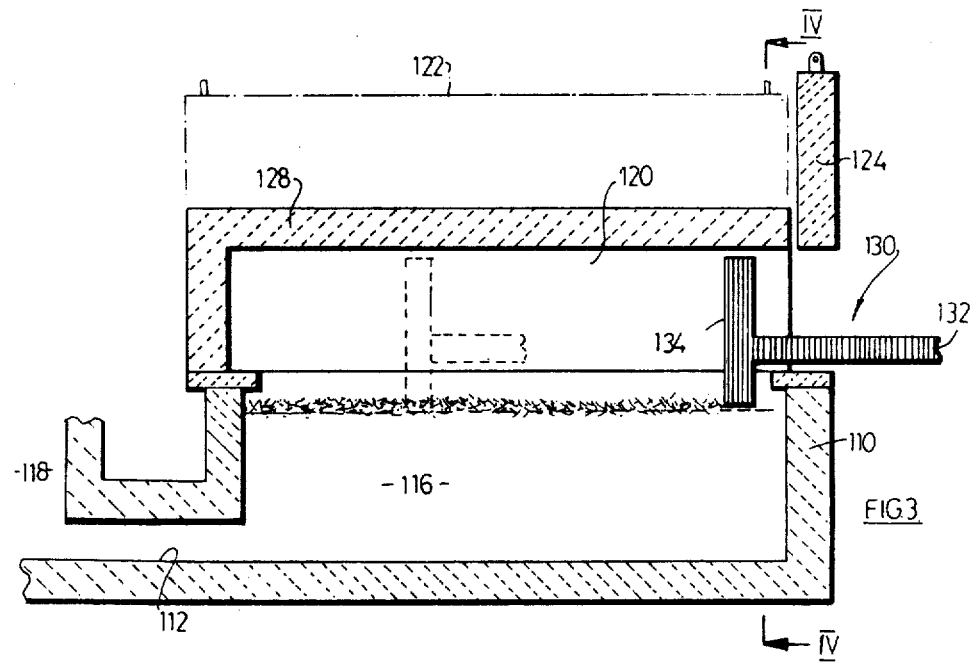
FIG. 3 is a side sectional view of a further glass melting plant, comprising a glass melting/refining furnace which is the second embodiment of this invention, and the feeding mechanism shown in FIG. 1.
Figure 4:
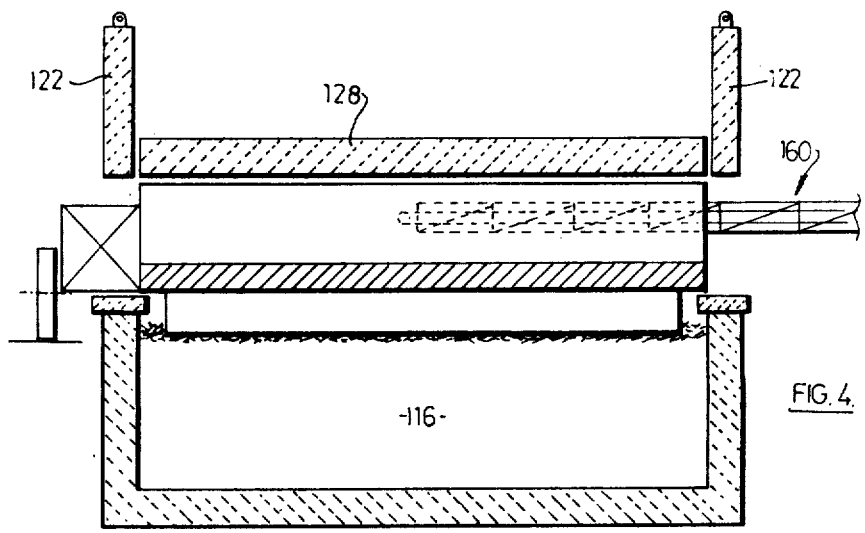
FIG. 4 is a sectional view of said further glass melting plant, taken on the line IV—IV of FIG. 3.

Said furnace also comprises an internal roof assembly 130 constructed of refractory material and comprising a boom portion 132, extending generally horizontally above one sie wall 110, and a head portion 134. Additionally, means is provided to move the assembly 130 between a retracted position in which the opening of the furnace chamber, as defined by the side walls 110, is substantially unrestricted, as shown in FIG. 3, and an advanced position. Both the head and boom portions extend across substantially the whole of the width of the furnace chamber 126 (that is in a direction at right angles to the direction of flow of molten glass along the duct 112) between the side walls 120 and 122 (see FIG. 4) and the head portion extends downwardly from the roof section 128 to a level adjacent to or below the level normally attained by molten glass in the furnace chamber.

The furnace which is the second embodiment of this invention is used in conjunction with feeding mechanism, similar to that described in relation to the first embodiment, comprising a truck (not shown) mounted in a rail track extending lengthwise of the furnace (that is in a direction parallel to said direction of flow of molten glass through the duct 112), from which truck projects the boom of a conveyor assembly 160. In the use of said feeding mechanism, the side wall 122 is lifted, and with the conveyor assembly 160 extending through the opening provided thereby said truck makes several passes lengthwise of said furnace. The degree of extent of said boom is varied, as hereinbefore described, to cause glass batch material to be deposited through the opening of the furnace chamber 116 to cover the exposed surface of the body of molten glass within the said chamber to be covered, to a substantially uniform depth, with glass batch material.

When it is desired to reduce the output from the melting/refining furnace, the interior roof assembly 130 is moved from its retracted towards its advanced position, restricting the effective opening of the chamber 116 and thus the surface area of the body of molten glass therein for the reception of batch material.

At the same time as the interior roof assembly is moved from its advanced position, the control means of the feeding mechanism is operated to restrict the path of travel of the truck along the rail track, so that said feeding mechanism is operative to cover the now-reduced surface of the melt with glass batch material. It will be appreciated that, whereas in the first embodiment, the control mechanism was operative to restrict the extension of the boom across the furnace chamber in the second embodiment the control mechanism is operative to control movement of the truck along the trackway.

The fully advanced position of the interior roof assembly is shown in dotted lines in FIG. 3, in which said roof assembly extends over a major part of the opening of the furnace 116, as defined by the walls 110, a minor part only of the surface of molten glass in the chamber being exposed for the application thereto of glass batch material. The proximity of the head portion 134 with the said surface of the melt prevents, on the application of glass batch material to the uncovered surface, movement of such glass batch material onto that part of the surface covered by said inner roof assembly. Furthermore, as in the first embodiment, the interior roof assembly, and in particular the boom portion 132, acts as thermal barrier means to retrict the emission of heat from the furnace chamber, which may otherwise cause the atmosphere beneath the exterior roof assembly to heat up to an extent detrimental to the conveyor assembly.

Whereas the control means of the feeding mechanism is described as being manually operable, in the second embodiment of this invention, in which the interior roof assembly is continuously adjustably positionably variable, conveniently said control means of the feeding mechanism is related with the means to move the interior roof assembly between its retracted and advanced position in a manner such that one control (being a control which determines the output of molten glass required from the furnace) varies both said means automatically.

This invention also provides a method of melting glass, comprising delivering state glass batch material onto the surface of the body of molten glass undergoing heating in a furnace chamber, withdrawing molten glass from a chamber and controlling the area of the surface of said body of molten glass batch material is delivered in accordance with the rate of withdrawal of molten glass from the chamber. Whereas this method is conveniently practised by the utilisation of one or other of the glass melting plants hereinabove described, it is feasible to carry out the performance of this invention utilising a conventional glass melting furnace, and a plurality of floatble insulation elements which may be positioned on the body of molten glass in the chamber. Thus, the area of glass presented for the application of glass batch material may readily be reduced, whilst said floatable insulation elements provide thermal barrier means to reduce the emission of heat from those parts of the said surface over which glass batch material is not spread. Such floatable insulation elements may conveniently be deposited in place by the use of an electric hoist, similar to that described in the first embodiment of the invention. As floatable insulation elements, conveniently blocks of lightweight ceramic material are used.

It will be appreciated that, in the practice of this invention, not only is there provided a means for reducing the output of glass from a furnace, but there is additionally provided a means whereby a single furnace design may be used for the manufacture of a variety of glass and the like heat-fuseable vitreous materials, which may require different melting temperature conditions.

We claim:

1. A furnace for use in the melting of glass and comprising a furnace chamber for containing a body of molten glass, heating means for heating the body of molten glass, and outlet means through which molten glass is conducted from the chamber, wherein the furnace comprises
   a. means defining an opening through which solid state glass batch material may be delivered into the furnace chamber, and
   b. means for varying the area of the molten glass which is exposed for the reception of batch material.

2. A furnace according to claim 1 wherein the means for varying the surface area of the molten glass comprises covering means adapted to cover part of the opening.

3. A furnace according to claim 2 wherein the covering means provides a thermal barrier to restrict flow of heat from the surface of the molten glass over which it extends.

4. A furnace according to claim 2 wherein the means defining the opening of the furnace comprises wall members thereof, and the covering means is provided by one or more roof sections which may be mounted on the wall members over the opening to restrict the area of the opening through which batch material may be delivered to the furnace chamber.

5. A furnace according to claim 2 wherein the means defining the opening comprises wall members of the furnace, and the covering means is provided by a roof assembly mounted for movement across the opening between a withdrawn position in which the opening is at least substantially unrestricted, and solid state batch material may be introduced into the chamber to lie on substantially the whole of the surface of molten glass in the chamber, and an advanced position in which the roof assembly extends over a major part of the opening, exposing a minor part of the surface of molten glass in the chamber for the application of batch material.

6. A furnace according to claim 1 wherein the means for varying the surface area of the molten glass which is exposed for the reception of batch material is provided by floatable insulation elements which may be positioned on the body of molted glass in the chamber.

7. In a furnace for use in the melting of glass or the like vitreous material and comprising a furnace chamber for containing a body of molten glass, outlet means through which molten glass may be conducted from the chamber, and heating means for heating the body of molten glass,
   the improvement wherein the furnace is provided with means defining an opening through which solid state glass batch material may be introduced into the chamber to lie on the body of molten glass within the chamber, means being provided which is selectively positionable across the opening to restrict the area of glass presented for the application of batch material.

8. The invention according to claim 9 wherein the selectively positionable means is provided by a plurality of independent roof sections, each of which may be mounted on the furnace to partially close the opening, whereby the area of glass presented for the application of batch material is restricted.

9. The invention according to claim 8 wherein the roof sections, when mounted on the furnace, extend downwardly to a level adjacent to or below the level normally attained by molten glass in the furnace chamber.

10. The invention according to claim 7 wherein the thermal barrier means is provided by a floatable insulation elements which may be positioned on the body of molten glass in the chamber to restrict the area of glass presented for the application of batch material.

11. The invention according to claim 7 wherein the selectively positionable means is mounted for movement across the opening between a withdrawn position in which the opening is at least substantially unrestricted, and solid state batch material may be introduced into the chamber to lie on substantially the whole of the surface of molten glass in the chamber, and an advanced position in which said means extends over a major part of the opening, exposing a minor part of the surface of molten glass in the chamber for the application of batch material.

12. The invention according to claim 11 wherein the selectively positionable means is provided by a roof assembly, a leading end portion of which is provided by a head assembly which extends across at least substantially the whole of the width of the furnace, and extends downwardly to a level adjacent to or below the level normally attained by molten glass in the furnace chamber.

13. In combination,
   a. a furnace for use in the melting of glass and comprising a furnace chamber for containing a body of molten glass and having means defining an opening through which solid state glass batch material may be introduced into the chamber to lie on the body of molten glass, outlet means through whch molten glass may be conducted from the chamber, heating means for heating the body of molten glass, and barrier means for varying the surface area of the molten glass which is exposed for the application of batch material, and
   b. feeding mechanism to deliver batch material to the furnace chamber, the feeding mechanism being capable of delivering batch material over the whole of the surface of the molten glass, and having associated therewith control means which is operative to restrict the area of the molten glass to which the feeding mechanism delivers solid state material.

14. The combination according to claim 13 wherein the control means is operable manually.

15. The combination according to claim 13 wherein the control means is operable automatically, in dependence upon the area of glass presented for the application of batch material.

16. The combination according to claim 13 wherein the feeding mechanism provides a delivery path along which solid state material travels toward the furnace chamber, means being provided by which the delivery path may be traversed in at least one direction at right angles to the path.

17. The combination according to claim 16 wherein means is also provied by which the delivery path may be traversed in a further direction parallel to the path.

18. A method of melting glass comprising
   a. delivering solid state glass batch material onto the surface of a body of molten glass undergoing heating in a furnace chamber;
   b. withdrawing molten glass from the chamber; and
   c. controlling the area of the surface of the body of molten glass onto which glass batch material is delivered in accordance with the rate of withdrawal of molten glass from the chamber.

19. A method according to claim 18 wherein the area of the surface of the body of molten glass onto which glass batch material is delivered is controlled by the steps:
   d. covering or uncovering part of the furnace chamber to expose, for the reception of batch material, an area of the surface of the body of molten glass which is proportional to the rate of withdrawal of molten glass from the furnace chamber, and
   e. delivering glass batch material to the uncovered part of said surface.

20. A method according to claim 19 wherein the surface of the body of molten glass is covered by thermal barrier means which is effective to restrict heat flow from the surface of the molten glass over which it extends.

21. A method accoding to claim 18 wherein the area of the surface of the body of molten glass is covered by the use of floatable insulation elements which are positioned on the body of molten glass.

22. A method according to claim 20 wherein the thermal barrier means is provided by a roof assembly which is moved in a direction from a withdrawn position in which the opening is at least substantially unrestricted, and solid state glass batch material may be introduced into the chamber to lie over substantially the whole of the surface of molten-glass in the chamber, and an advanced position in which the thermal barrier means extends over a major part of the opening exposing a minor part of the surface of molten glass in the chamber to which solid state material may be applied, to reduce the area of molten glass available for the application of solid state glass batch material a desired value.

* * * * *